US012752382B2

(12) United States Patent
Brosseau et al.

(10) Patent No.: US 12,752,382 B2
(45) Date of Patent: Oct. 6, 2026

(54) TOOL FOR ASSEMBLY AND STORAGE OF ROTARY ENGINE

(71) Applicant: PRATT & WHITNEY CANADA CORP., Longueuil (CA)

(72) Inventors: Dave Brosseau, Sainte-Catherine (CA); Jonathan Ross, Boucherville (CA); Ken Cunningham, Beloeil (CA); Noemie Hebert, Delson (CA); Frederic Roy, Varennes (CA); Edwin Schulz, St-Bruno (CA); Adam Messier, Saint-Lambert (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 358 days.

(21) Appl. No.: 18/536,893

(22) Filed: Dec. 12, 2023

(65) Prior Publication Data

US 2025/0187126 A1 Jun. 12, 2025

(51) Int. Cl.

*B23P 19/04* (2006.01)
*F01C 1/22* (2006.01)
*F02B 53/00* (2006.01)

(52) U.S. Cl.

CPC ....... *B23P 19/042* (2013.01); *F02B 2053/005* (2013.01)

(58) Field of Classification Search

CPC .............. B23P 19/042; F02B 2053/005; F04C 2230/604; F01C 1/22

See application file for complete search history.

(56) References Cited

U.S. PATENT DOCUMENTS 3,913,198 A * 10/1975 Ernest ..................... B23P 21/00 29/888.012
3,949,711 A * 4/1976 Shobert, II ............ F01C 21/106 418/152

(Continued)

FOREIGN PATENT DOCUMENTS

CA 2938284 A1 6/2017
CA 2938284 C * 1/2024 .............. F02B 55/10
EP 4166751 A1 * 4/2023 .......... F04C 15/0011

OTHER PUBLICATIONS

European Search Report issue in counterpart EP application No. 24219393.6 on Apr. 9, 2025.

*Primary Examiner* — Bayan Salone
(74) *Attorney, Agent, or Firm* — NORTON ROSE FULBRIGHT CANADA LLP

(57) ABSTRACT

An assembly, has: a rotor of a rotary internal combustion engine, the rotor having two end faces and a peripheral face between the two end faces, the peripheral face defining apex portions circumferentially-spaced from one another, the rotor having seals, the seals including: apex seals extending between the two end faces and each located at a respective one of the apex portions, end seals engaging ends of the apex seals, and arc seals located on the two end faces and extending between the apex portions; and a tool engaged to the rotor and abutting the seals, the tool having: two cover plates, the rotor located between the two cover plates, the two cover plates abutting the end seals and the arc seals; and posts secured to one or more of the two cover plates and extending between the two cover plates, the posts abutting the apex seals.

10 Claims, 5 Drawing Sheets

(56) References Cited

U.S. PATENT DOCUMENTS

| | | | | |
|---|---|---|---|---|
| 8,312,607 | B2 * | 11/2012 | Pecherzewski | F04C 5/00 29/270 |
| 9,850,758 | B2 * | 12/2017 | Gekht | F16J 15/545 |
| 10,072,566 | B2 * | 9/2018 | Villeneuve | F01C 21/06 |
| 10,995,660 | B2 * | 5/2021 | Villeneuve | F01C 19/12 |
| 12,345,262 | B2 * | 7/2025 | Luyckx | F01C 1/22 |
| 2007/0065330 | A1 * | 3/2007 | Wallack | C22C 38/44 420/95 |
| 2011/0146044 | A1 | 6/2011 | Pecherzewski | |
| 2017/0175620 | A1 * | 6/2017 | Villeneuve | F01C 21/06 |
| 2018/0347457 | A1 * | 12/2018 | Villeneuve | F02B 53/10 |
| 2024/0426300 | A1 * | 12/2024 | Luyckx | F04C 15/0011 |

* cited by examiner

TOOL FOR ASSEMBLY AND STORAGE OF ROTARY ENGINE

TECHNICAL FIELD

The application relates generally to internal combustion engines and, more particularly, to rotary internal combustion engines and tools used for assembling such engines.

BACKGROUND

Combustion chambers of a rotary engine, such as a Wankel engine, are delimited radially by the rotor, apex seals and rotor housing to create working chambers, and axially by a side housing on each side of the rotor. Thus the rotor housing and side housing face the combustion chambers and is thus subjected to high pressure and thermal loads. At the same time, the rotor and side housings provide the running surface for the rotor's sealing system which typically includes apex seals, arc seals, end seals and oil seals. Assembling a rotary engine is a complicated task because care should be taken to ensure that all of the seals remain in place during assembly. Existing methods are satisfactory to some extend, but improvement is sought.

SUMMARY

In one aspect, there is provided an assembly, comprising: a rotor of a rotary internal combustion engine, the rotor having two end faces and a peripheral face between the two end faces, the peripheral face defining apex portions circumferentially-spaced from one another, the rotor having seals, the seals including: apex seals extending between the two end faces and each located at a respective one of the apex portions, end seals engaging ends of the apex seals, and arc seals located on the two end faces and extending between the apex portions; and a tool engaged to the rotor and abutting the seals, the tool having: two cover plates, the rotor located between the two cover plates, the two cover plates abutting the end seals and the arc seals; and posts secured to one or more of the two cover plates and extending between the two cover plates, the posts abutting the apex seals.

The assembly described above may include any of the following features, in any combinations.

In some embodiments, a cover plate of the two cover plates defines corners and sides interspaced between the corners, the cover plate having a protrusion extending from a side of the sides and away from a central axis of the rotor, the protrusion overlapping an arc seal of the arc seals.

In some embodiments, the protrusion is centered between two adjacent corners of the corners.

In some embodiments, the sides curve inwardly toward the central axis, the sides being concave.

In some embodiments, a cover plate of the two cover plates defines corners and sides interspaced between the corners, the cover plate defining legs protruding from the sides proximate the corners, the legs defining abutment faces for resting the assembly on a flat surface.

In some embodiments, the legs include two legs for each of the corners, the two legs extending away from one another such that the assembly is able to be laid on the flat surface at a plurality of orientations.

In some embodiments, a distance between the abutment faces and a line interconnecting two adjacent corners of the corners is greater than a distance between the line and any points on the peripheral face of the rotor.

In some embodiments, a post of the posts includes a first post section secured to, and protruding from, a first cover plate of the two cover plates and a second post section secured to, and protruding from, a second cover plate of the two cover plates, the tool having two modules, a first module of the two modules including the first cover plate and the first post sections, a second module of the two modules including the second cover plate and the second post sections, the two modules separatable from one another and configured to conjointly envelop the rotor.

In some embodiments, a post of the posts has an inner face abutting an apex seal of the apex seals, the inner face defining two surfaces mating with the peripheral face of the rotor on opposite sides of the apex seal and a curved face mating with a distal end of the apex seal.

In some embodiments, the cover plates define central bores.

In another aspect, there is provided a tool for clamping a rotor of a rotary internal combustion engine, the rotor having opposed end faces and a peripheral face extending between the opposed end faces, the peripheral face defining apex portions circumferentially spaced from one another relative to a central axis of the rotor, the tool comprising: a first module having: a first cover plate for covering one of the opposed end faces and having first sides and first corners interspaced between the first sides, and first posts for overlapping the apex portions and protruding from the first cover plate at the first corners; and a second module having: a second cover plate for covering the other of the opposed end faces and having second sides and second corners interspaced between the second sides, and second posts for overlapping the apex portions and protruding from the second cover plate at the second corners, the first posts circumferentially aligned with the second posts relative to the central axis of the rotor; wherein the first module and the second module conjointly define a rotor-receiving volume sized for receiving the rotor of the rotary internal combustion engine.

The tool described above may include any of the following features, in any combinations.

In some embodiments, the first cover plate defines first protrusions extending from the first sides and away from the central axis of the rotor, the first protrusions configured for overlapping an arc seal of the rotor.

In some embodiments, each of the first protrusions are centered between two adjacent corners of the first corners.

In some embodiments, the first sides curve inwardly toward the central axis, the first sides being concave.

In some embodiments, the first cover plate defines first legs protruding from the first sides proximate the first corners, the first legs defining abutment faces for resting the tool on a flat surface.

In some embodiments, the first legs include two first legs for each of the first corners, the first legs extending away from one another such that the tool is able to be laid on the flat surface at a plurality of orientations.

In some embodiments, a distance between the abutment faces and a line interconnecting two adjacent ones of the first corners is selected to be greater than a distance between the line and any points on a peripheral face of the rotor.

In some embodiments, the first module is detachably securable to the second module.

In some embodiments, a first post of the first posts defines an inner face defining two surfaces shaped to mate with a peripheral face of the rotor on opposite sides of an apex seal and a curved face shaped to mate with a distal end of the apex seal.

In some embodiments, the cover plates define central bores.

BRIEF DESCRIPTION OF THE DRAWINGS

Reference is now made to the accompanying figures in which.

DETAILED DESCRIPTION

Figure 1:
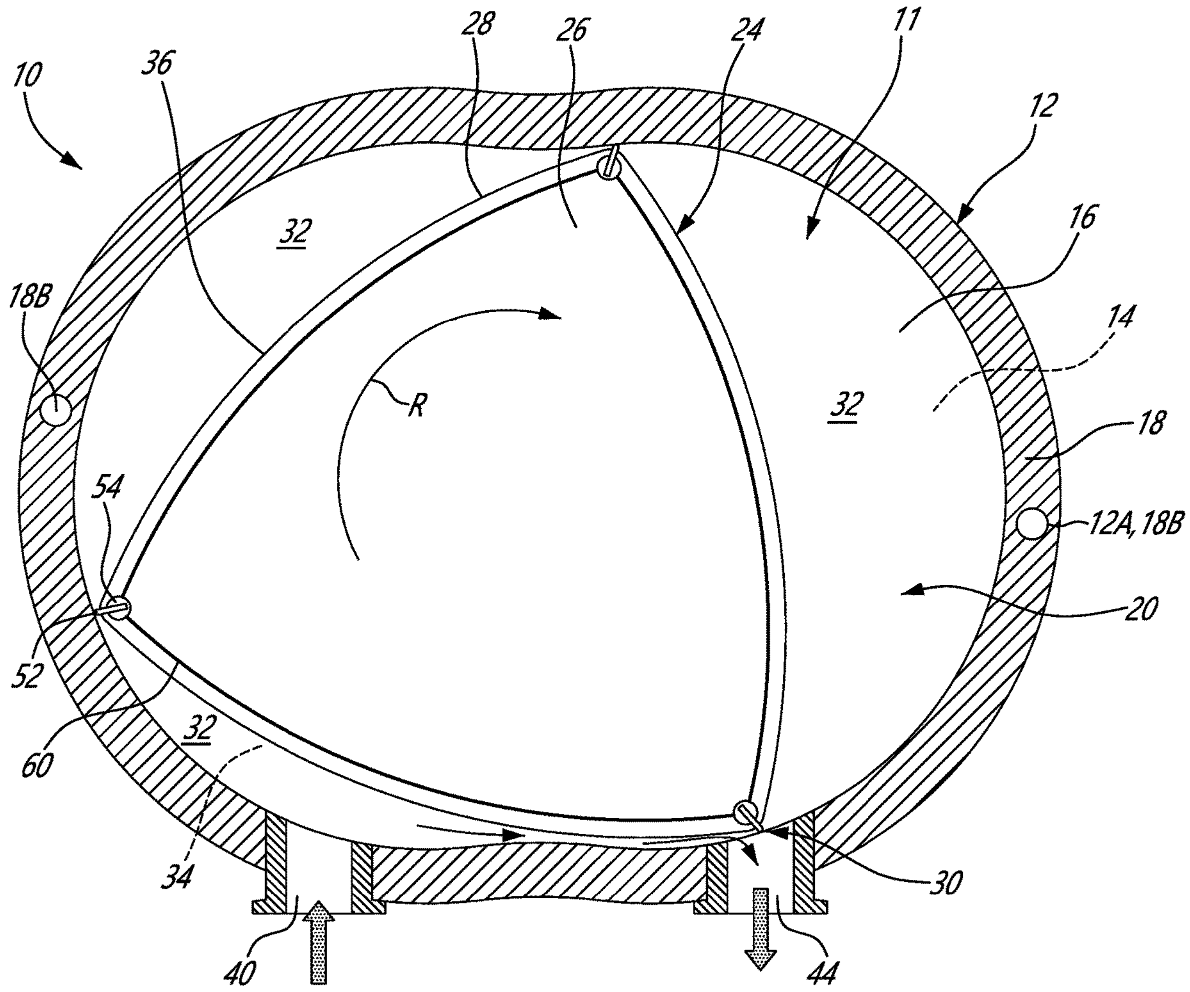
FIG. 1 is a schematic cross-sectional view of a rotary internal combustion engine in accordance with one embodiment.

Referring to FIG. 1, a rotary internal combustion engine, referred to simply as a rotary engine below, which may be a Wankel engine, is schematically shown at 10. The rotary engine 10 comprises an outer body also referred to as a housing assembly 12 having axially-spaced side housings 11, which each includes a side wall 14 and a side plate 16 mounted to the side wall 14, with a rotor housing 18 extending from one of the side housings 11 to the other, to form a rotor cavity 20. The rotor housing 18 has a first side and a second side opposite to the first side. The side housings 11 include a first side housing secured to the first side and a second side housing secured to the second side. The rotor cavity 20 is defined axially between the side housings 11 and circumscribed by the rotor housing 18. In FIG. 1, the side wall 14 is indicated with a dashed line because it sits below the side plate 16. The inner surface of the rotor housing 18 has a profile defining two lobes, which may be an epitrochoid. In some alternate embodiments, the side housings 11 include solely the side wall, that is, the side wall and the side plate may be combined into a single element.

The housing assembly 12 includes a coolant circuit 12A, which may include a plurality of coolant conduits 18B defined within the rotor housing 18. The coolant conduits 18B extends from one of the side housings 11 to the other. The coolant circuit 12A is used for circulating a coolant, such as water or any suitable coolant, to cool the housing assembly 12 during operation of the rotary engine 10. Although only two coolant conduits 18B are shown, it is understood that more than two coolant conduits 18B may be used without departing from the scope of the present disclosure.

An inner body or rotor 24 is received within the rotor cavity 20. The rotor 24 has axially spaced end faces 26 adjacent to the side walls 14, and a peripheral face 28 extending there between. The peripheral face 28 defines three circumferentially-spaced apex portions 30, and a generally triangular profile with outwardly arched sides 36. The apex portions 30 are in sealing engagement with the inner surface of rotor housing 18 to form three rotating combustion chambers 32 between the rotor 24 and housing assembly 12. The combustion chambers 32 vary in volume with rotation of the rotor 24 within the housing assembly 12. The geometrical axis of the rotor 24 is offset from and parallel to the axis of the housing assembly 12. In some embodiments, more or less than three rotating combustion chambers may be provided with other shapes of the rotor.

The combustion chambers 32 are sealed. In the embodiment shown, each rotor apex portion 30 has an apex seal 52 extending from one end face 26 to the other and biased radially outwardly against the rotor housing 18. An end seal 54 engages each end of each apex seal 52 and is biased against the respective side wall 14. Each end face 26 of the rotor 24 has at least one arc-shaped face seal 60 running from each apex portion 30 to each adjacent apex portion 30, adjacent to but inwardly of the rotor periphery throughout its length, in sealing engagement with the end seal 54 adjacent each end thereof and biased into sealing engagement with the adjacent side plates 16 of the side housings 11. Alternate sealing arrangements are also possible.

Although not shown in the Figures, the rotor 24 is journaled on an eccentric portion of a shaft such that the shaft rotates the rotor 24 to perform orbital revolutions within the rotor cavity 20. The shaft may rotate three times for each complete rotation of the rotor 24 as it moves around the rotor cavity 20. Oil seals are provided around the eccentric to impede leakage flow of lubricating oil radially outwardly thereof between the respective rotor end face 26 and side housings 11. During each rotation of the rotor 24, each chamber 32 varies in volumes and moves around the rotor cavity 20 to undergo the four phases of intake, compression, expansion and exhaust, these phases being similar to the strokes in a reciprocating-type internal combustion engine having a four-stroke cycle.

The engine includes a primary inlet port 40 in communication with a source of air and an exhaust port 44 In the embodiment shown, the ports 40, 44 are defined in the rotor housing 18. Alternate configurations are possible.

In a particular embodiment, fuel such as kerosene (jet fuel) or other suitable fuel is delivered into the chamber 32 through a fuel port (not shown) such that the chamber 32 is stratified with a rich fuel-air mixture near the ignition source and a leaner mixture elsewhere, and the fuel-air mixture may be ignited within the housing using any suitable ignition system known in the art (e.g. spark plug, glow plug). In a particular embodiment, the rotary engine 10 operates under the principle of the Miller or Atkinson cycle, with its compression ratio lower than its expansion ratio, through appropriate relative location of the primary inlet port 40 and exhaust port 44.

Figure 2:
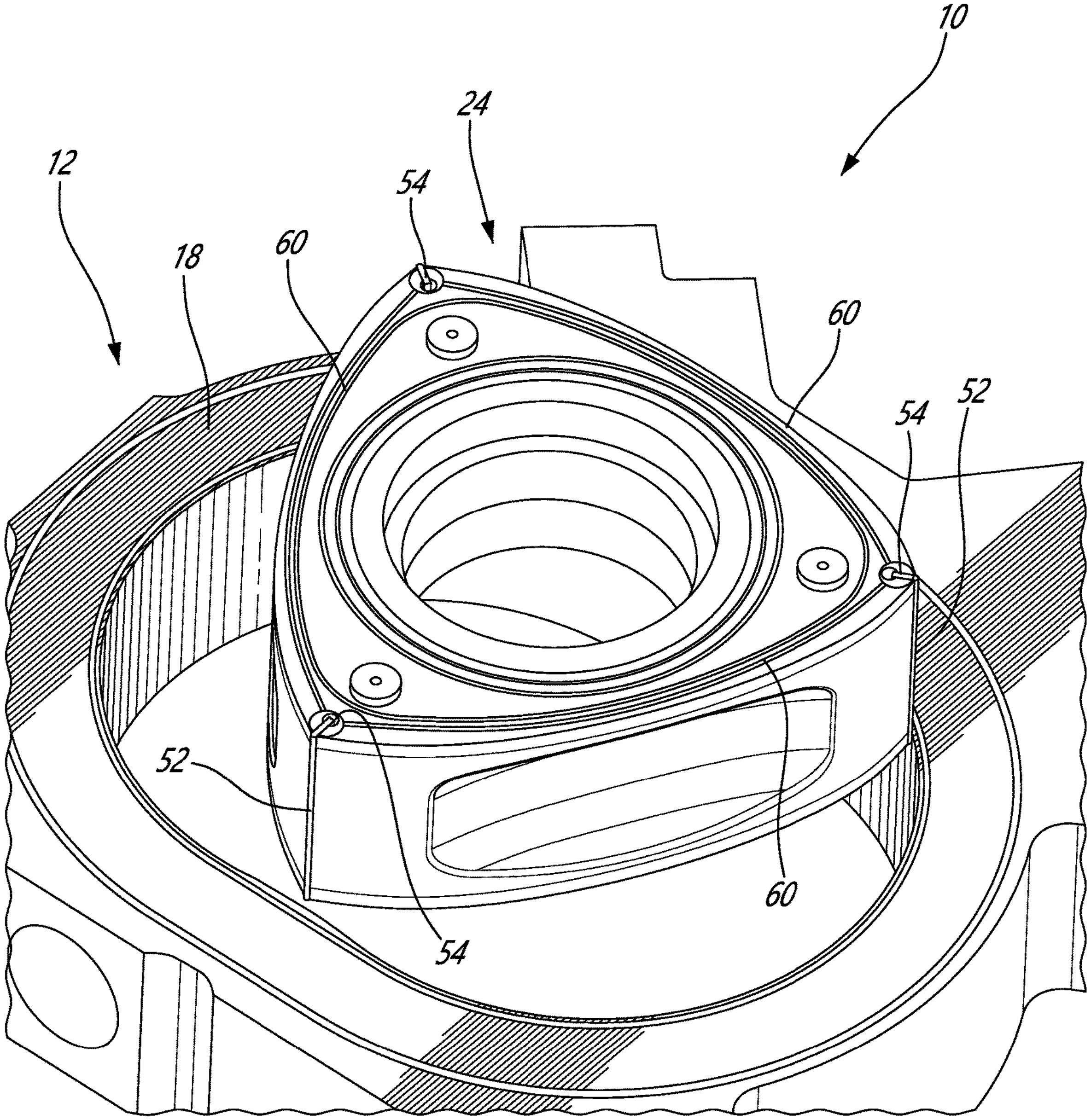
FIG. 2 is a top three dimensional view of a rotor housing and rotor of the rotary internal combustion engine of FIG. 1 during an assembly process.

Referring to FIG. 2, a three dimensional exploded view of the rotary engine 10 illustrating the rotor housing 18 and the rotor 24 is shown and better illustrates the different seals, namely the apex seals 52, the end seals 54, and the arc seals 60, collectively referred to as the "seals" in the present disclosure.

Biasing members, such as springs for instance, are used to bias the seals outwardly and away from the rotor 24 such as to engage running faces defined by the outer body 12. Put differently, once the rotor 24 is received within the outer body 12, the seals are biased against the outer body 12 to provide the desired sealing effect. As one can readily appreciate, maintaining those seals seated within correspondingly-shaped grooves defined by the rotor 24 may pose a challenge during assembly of the rotary engine 10. The seals have to be compressed sufficiently to provide the necessary clearance for the rotor 24 to be received within the rotor housing 18 for instance. Moreover, in some cases, the rotor 24 may be required to be shelved before a subsequent step in which it is mated with the outer body 12. One cannot expect an employee to keep the seals in place during this time.

Put differently, when assemblers face the task of inserting the rotors inside the housings in the build process, they encounter the complex and challenging issue of keeping the apex seals and other various seals well engaged in the rotor while proceeding to the insertion. Currently, the assemblers must use multiple sets of hands to keep the apexes in place and make sure that they stay engaged in the right place all the while ensuring that the rotor is engaging properly within the rotor housing. It is desired that all seals in the rotor remain straight and there is little margin to allow for the seals to move out of place with the spring force pushing on them. Moreover, care is required to align the rotor with the prescribed orientation within the rotor housing and eventually with the phasing gear in the rotor. In short, this can be a daunting and time-consuming task which requires multiple assemblers with experience. The main difficulty here arises from the fact that the apex seals are spring loaded and that once they start to be inserted, they get pushed towards the inside and the opposite end tends to want to move outward or escape from the engagement in the rotor. Moreover, there is no way of storing the assembled rotor in an efficient and safe way with all seals installed.

Figure 3:
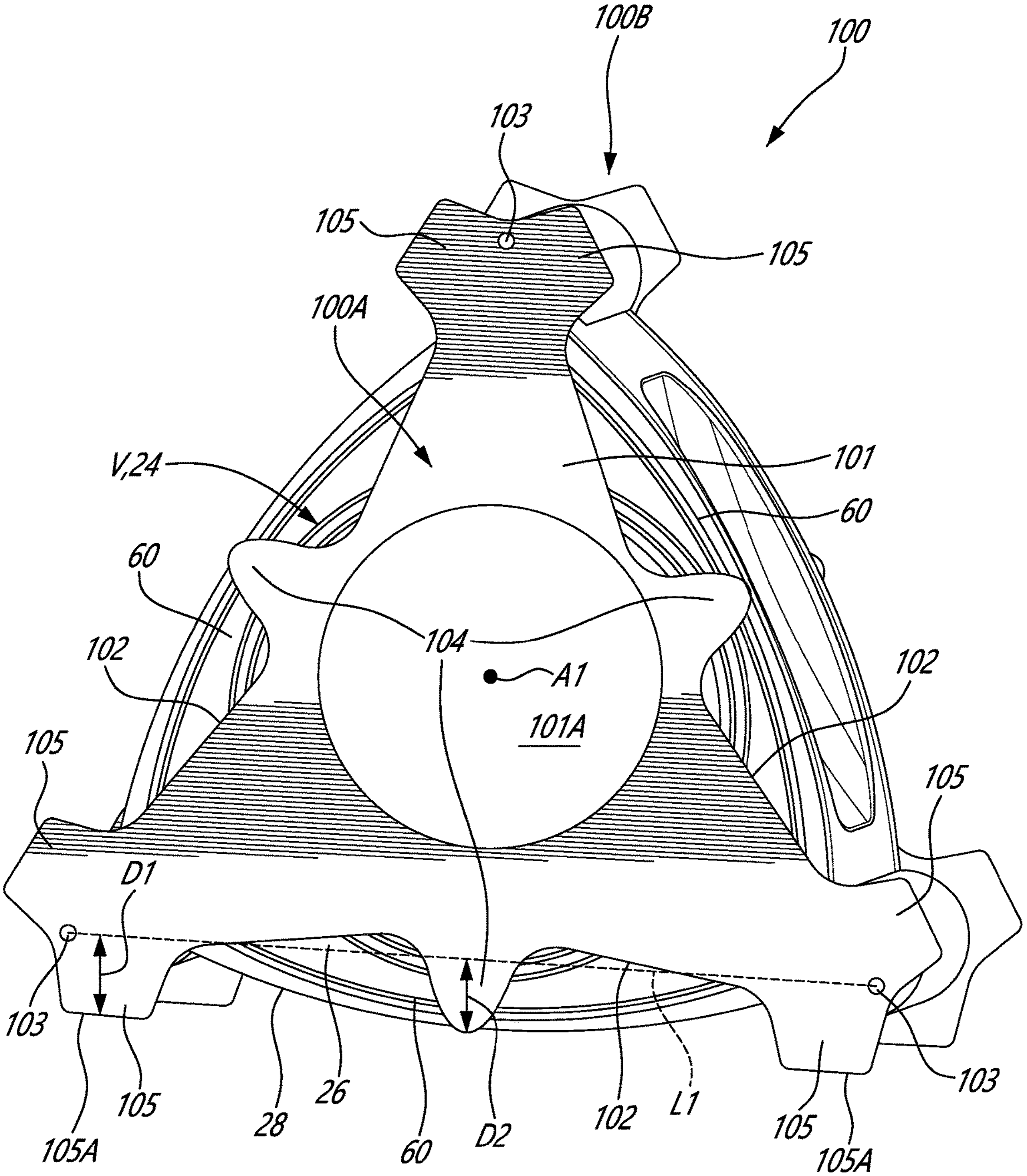
FIG. 3 is a three dimensional view of a tool enclosing the rotor of FIG. 2.
Figure 4:
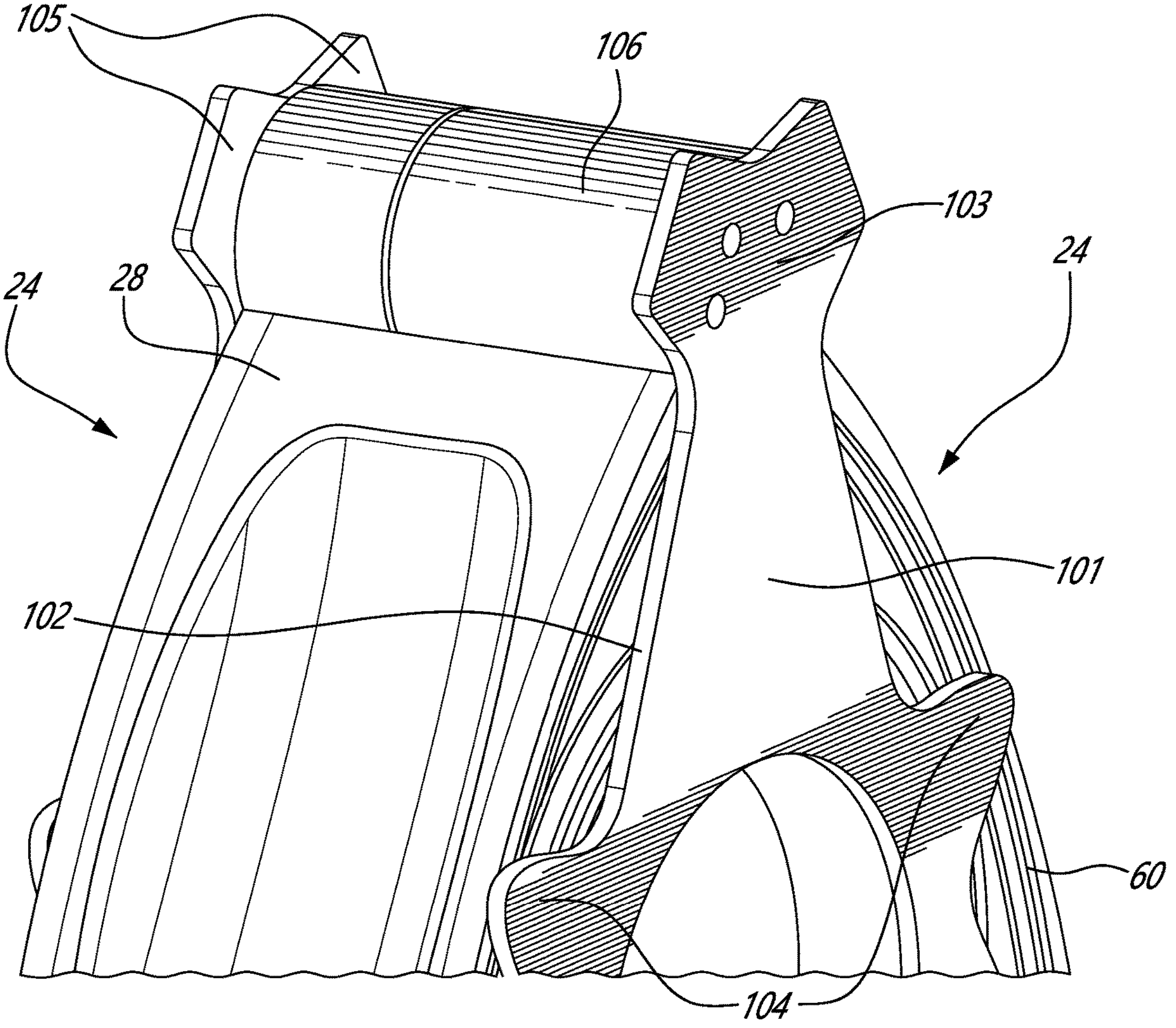
FIG. 4 is a side three dimensional view of the tool and rotor of FIG. 3.

Referring to FIGS. 3-4, a tool used for an assembly process of the rotary engine 10 is shown at 100 as part of an assembly of the tool 100 with the rotor 24. The tool 100 may at least partially alleviate the aforementioned drawbacks. The tool 100 is configured to clamp or enclose the rotor 24 while abutting the different seals, namely, the apex seals 52, the end seals 54, and the arc seals 60. Herein, the expression "enclose" implies that the rotor 24 is sandwiched within the tool 100. It need not be fully enclosed in a sealed box. The tool 100 may be used to maintain the seals in a slightly compressed configuration sufficiently to permit the insertion of the rotor 24 in the rotor cavity of the outer body 12 as will be discussed below.

In the present embodiment, the tool 100 includes a first module 100A and a second module 100B that conjointly define a rotor-receiving volume V sized for receiving the rotor 24 of the rotary engine 10 (FIG. 1). The first module 100A and the second module 100B may be regarded as two halves of the tool 100 although the two halves are not required to be symmetrical images of one another. The description below will focus on the first module 100A, which will be referred to as "the module" for conciseness, but it is understood that the below description applies equally to the second module 100B. The first module 100A and the second module 100B may be detachably securable to one another in some embodiments. In the present case, fasteners may be used to secure the two modules together. However, this may not be required since the two modules are frictionally engaged to the seals of the rotor 24. Hence, the two modules may remain attached to the rotor 24 by themselves until an employee separates the tool 100 from the rotor 24 as will be discussed below. Put differently, the two modules may be free of direct connection therebetween and may be connected together solely via the rotor 24.

The module 100A includes a cover plate 101 having sides 102 and corners 103 interspaced between the sides 102. In the present embodiment, the rotor 24 has three apex portions and, consequently, the cover plate 101 has three corners 103 and three sides 102. In some other embodiments of rotary engines, more than three corners and sides may be used. The cover plate 101 defines a central bore 101A. This central bore 101A may be sized to accommodate a shaft of the rotary engine 10 during an assembly process. The central bore 101A may provide a better grip while providing the most room possible to move the rotor during the assembly process.

The cover plate 101 is sized to overlap one of the two end faces 26 of the rotor 24. In the present embodiment, the cover plate 101 defines protrusions 104, three in the present embodiment, that each extends from a respective one of the three sides 102. The protrusions 104 extend away from a central axis A1 of the rotor 24. The three sides 102 may be concave. In other words, the three sides 102 extend towards the central axis A1 between the corners 103. As shown, each of the protrusions 104 may be substantially centered between two adjacent ones of the corners 103. The protrusions 104 extend from bases at the sides 102 to tips being spaced apart from the sides 102. The distance between the bases and the tips is selected such that the protrusions 104 overlap the arc seals 60. Hence, the protrusions 104 are configured to maintain the arc seals 60 within their respective grooves defined by the end faces 26 of the rotor 24. The use of the concave shape and the extensions 104 may ensure that the tool does not interfere with vertical storage of the rotor as described below. It also allows for a visual check of the engagement of both the arc seals and oil seals once the tool is installed on the rotor. After storage, a spring back test can be performed on the seals while still installed in the tool to verify that the seals move freely in their respective grooves, even after prolonged storage periods.

Still referring to FIG. 3, the tool 100 includes legs 105 for resting an assembly of the tool 100 and the rotor 24 on a flat surface, such as a shelf or a ground for instance. Two of the legs 105 are provided proximate each of the corners 103; the two of the legs 105 extending away from one another and away from the corners 103. The legs 105 protrude from the sides 102. The legs 105 define abutment faces 105A at distal ends of the legs 105. The abutment faces 105A are shaped to abut said flat surface.

By providing two of the legs 105 at each corners 103, the assembly may be laid on the flat surface at a plurality of relative orientations. Put differently, in the present case where the rotor 24 has three apex portions, the assembly may be laid vertically on the flat surface at three different orientations by rotating the assembly about the central axis A1 of the rotor 24. The expression "vertically" implies that the central axis A1 of the rotor 24 is parallel to the flat surface the assembly is laid on.

A distance D1 between the abutment faces 105A and a line L1 interconnecting two adjacent ones of the corners 103 is selected to be greater than a distance D2 between the line L1 and any points on the peripheral face 28 of the rotor 24. This may ensures that the peripheral face 28 is free of contact with the flat surface when the assembly is stored vertically and supported by the flat surface. This may prevent damage to the rotor 24.

Referring now to FIG. 4, the module 100A includes posts 106 protruding from the cover plate 101 at the corners 103. In the present configuration, the posts 106 of the first module 100A have a longer length than the posts of the second module 100B. This may permit the posts 106 of the first module 100A to exert a greater force on the apex seals 52 during use. The posts 106 are configured to maintain the apex seals 52 seated within their respective grooves defined at the apex portions of the peripheral face 28 of the rotor 24. Thus, the posts 106 overlap the apex portions of the rotor 24. Once assembled, the posts 106 of each of the two modules are circumferentially aligned with one another relative to the central axis A1 of the rotor 24. Put differently, ends of the posts of the first module 100A may face and, in some cases, abut, ends of the posts of the second module 100B.

Figure 5:
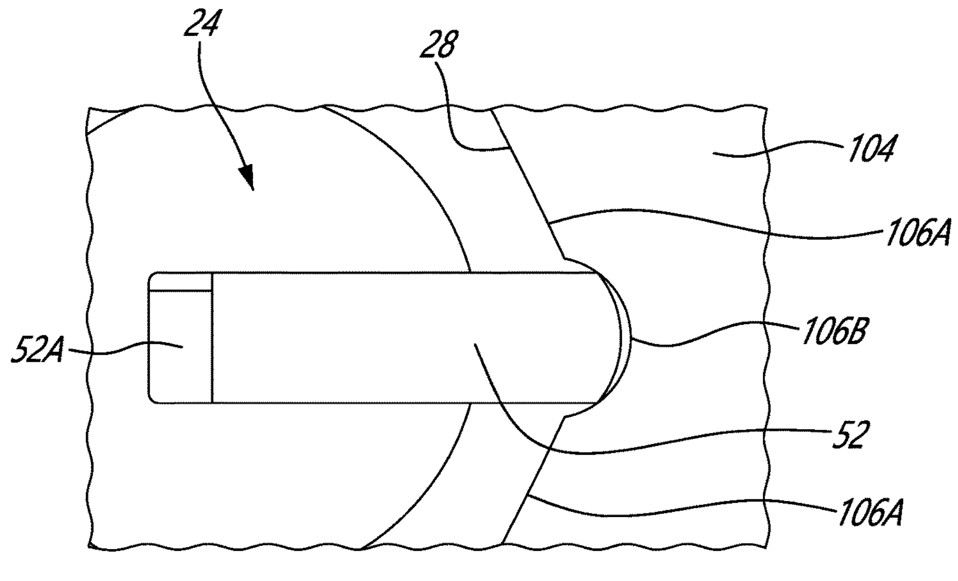
FIG. 5 is a cross-sectional view of the tool and rotor of FIG. 3 on a plane normal to a central axis of the rotor and illustrating one of apex seals of the rotor.

Referring to FIG. 5, a cross-sectional view of the rotor 24 on a plane normal to the central axis A1 of the rotor 24 is shown and illustrates how one of the posts 106 cooperates with the peripheral face 28 of the rotor 24. As shown, the posts 106 define a concavities sized to mate with the apex portions of the rotor 24. The posts 106, at the concavities, include an inner face constituted of two surfaces 106A shaped to mate with the peripheral face 28 of the rotor 24 on opposite sides of the apex portions and a curved face 106B located between the two surfaces 106A and shaped to mate with a distal end of the apex seal 52. The distal end of the apex seal 52 is used for riding against the rotor housing 18 (FIG. 1) during use. A biasing member 52A sits within a groove defined by the rotor at the apex portions. The groove is sized to receive both of the biasing member 52A and the apex seal 52 that is biased outwardly against the rotor housing 18 by the biasing member 52A.

In the configuration shown in FIG. 5 in which the posts 106 engage the rotor 24, the apex seals 52 are maintained within their respective grooves and sufficiently compressed such that no more compression is required when it is desired to insert the rotor 24 in the rotor housing 18. In some cases, the tool 100 and the posts 106 compress the apex seals 52 inwardly sufficiently such that a small play is provided between the distal ends of the apex seals 542 and the rotor housing 18 to facility the insertion of the rotor 24 in the rotor housing 18.

Figure 6:
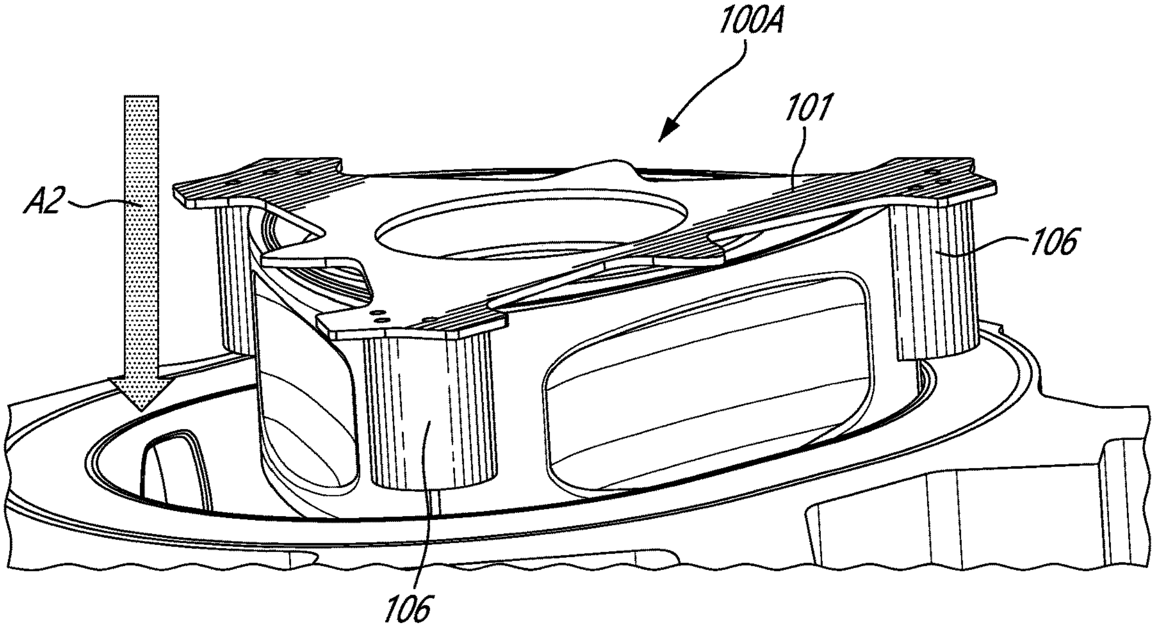
FIG. 6 is a side three dimensional view of the rotor being inserted in the rotor housing with a portion of the tool engaged to the rotor.
Figure 7:
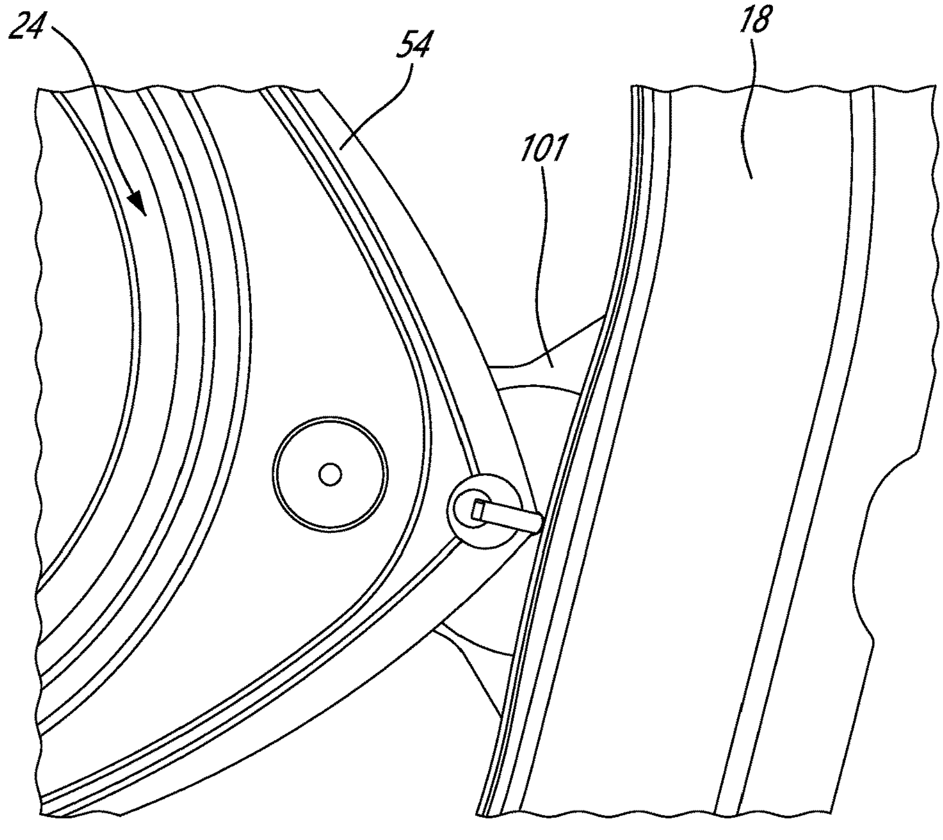
FIG. 7 is a bottom view illustrating the rotor and the tool.

Referring now to FIGS. 6-7, the tool 100 having been described above, a method of using the tool 100 is now described.

In the embodiment shown, when an employee finishes assembling the rotor 24, that is, after inserting all of the seals within the correspondingly-shaped grooves defined by the rotor 24, the employee may then shelf the rotor 24 by disposing said rotor 24 vertically and by abutting the abutment faces 105A defined by the legs 105 of the two cover plates 101 against the flat surface.

When it is time to install the rotor 24 within the rotor housing 18, the employee may separate the two modules 100A and 100B of the tool 100 such as to free one of the two end faces 26 of the rotor 24 as depicted in FIG. 6. Doing so frees up a portion of the apex seals 52 thereby permitting pre-inserting the rotor 24 inside the rotor cavity defined by the rotor housing 18 while maintaining the apex seals 52 compressed.

As discussed above the posts 106 maintain the apex seals 52 seated within the respective grooves thereby freeing up hands of the employee to properly align the rotor 24 within the rotor cavity of the rotor housing 18. The employee may thus move the rotor 24 which is still engaged by the first module 100A of the tool 100 and move the tool 100 and rotor 24 along a direction depicted by arrow A2 in FIG. 6. The installation may be done while the rotor housing is oriented horizontally such that the seals that are no longer supported by the tool do not disengage due to gravity. Applying grease to the unsupported seals after removing the tool is also another method to restrict the seal movement that could allow rotor installation at other angles such as in a downward direction.

The tool 100 may be able to maintain the apex seals 52 seated deep enough within their grooves such as to allow a small play between distal ends of the apex seals 52 and the rotor housing 18 to facilitate insertion of the rotor 24 within the rotor housing 18. As shown in FIG. 7, when the rotor 24 is at least partially inserted in the rotor cavity, the employee may rotate the rotor 24 until all of the apex seals 52 are in abutment against the rotor housing 18. Then, the employee may further push the rotor 24 within the rotor cavity and slowly separate the remaining module 100A of the tool 100 from the rotor housing 18 to complete its insertion.

The present disclosure then proposes a tool that may help installing the rotor in the rotor cavity by keeping the apex seals 52 as well as the other seals fixed in place and ready to be inserted. The seals, because of the tool 100, may remain in the same position and glide through the roundly shaped solids gently before entering the housing. This may allow the assemblers to focus on the crucial task of aligning the rotor correctly for the apex seals to serve their full purpose without having them falling out. The posts 106 are design to mimic the shape of the rotor 24 and exert a slight pressure that is uniformly distributed on the apex seals 52. The pressure is selected to allow for a smooth transition into the rotor housing 18.

The tool 100 further allows the storing of the rotor 24 fully assembled in an upright position. This may provide great time savings for the assemblers. Previously, the rotors had to be assembled one by one with their various springs and seals right before the process of inserting the assembled rotor into the rotor housing. The second module 100B of the tool 100 may be seen as a cover securable to the first module 100A via fasteners allows for the rotor 24 to be stored easily and safely in an upright position in the different angles thanks to the two legs present at each end of the tool 100. Additionally, this second module 100B creates a protection for the rotor 24 from every angle which may prevent most types of damages. The tool may be used to maintain oil seals properly seated within their respective grooves.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

In the context of the present disclosure, the expression "about" implies variations of plus or minus 10%. Also, the expression "substantially" is meant to encompass slight variations caused by, for instance, manufacturing tolerances.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An assembly, comprising:

a rotor of a rotary internal combustion engine, the rotor having two end faces and a peripheral face between the two end faces, the peripheral face defining apex portions circumferentially-spaced from one another, the rotor having seals, the seals including:

apex seals extending between the two end faces and each located at a respective one of the apex portions, end seals engaging ends of the apex seals, and arc seals located on the two end faces and extending between the apex portions; and a tool engaged to the rotor and abutting the seals, the tool having:

two cover plates, the rotor located between the two cover plates, the two cover plates abutting the end seals and the arc seals; and posts secured to one or more of the two cover plates and extending between the two cover plates, the posts abutting the apex seals.

2. The assembly of claim 1, wherein a cover plate of the two cover plates defines corners and sides interspaced between the corners, the cover plate having a protrusion extending from a side of the sides and away from a central axis of the rotor, the protrusion overlapping an arc seal of the arc seals.

3. The assembly of claim 2, wherein the protrusion is centered between two adjacent corners of the corners.

4. The assembly of claim 2, wherein the sides curve inwardly toward the central axis, the sides being concave.

5. The assembly of claim 1, wherein a cover plate of the two cover plates defines corners and sides interspaced between the corners, the cover plate defining legs protruding from the sides proximate the corners, the legs defining abutment faces for resting the assembly on a flat surface.

6. The assembly of claim 5, wherein the legs include two legs for each of the corners, the two legs extending away from one another such that the assembly is able to be laid on the flat surface at a plurality of orientations.

7. The assembly of claim 5, wherein a distance between the abutment faces and a line interconnecting two adjacent corners of the corners is greater than a distance between the line and any points on the peripheral face of the rotor.

8. The assembly of claim 1, wherein a post of the posts includes a first post section secured to, and protruding from, a first cover plate of the two cover plates and a second post section secured to, and protruding from, a second cover plate of the two cover plates, the tool having two modules, a first module of the two modules including the first cover plate and the first post sections, a second module of the two modules including the second cover plate and the second post sections, the two modules separatable from one another and configured to conjointly envelop the rotor.

9. The assembly of claim 1, wherein a post of the posts has an inner face abutting an apex seal of the apex seals, the inner face defining two surfaces mating with the peripheral face of the rotor on opposite sides of the apex seal and a curved face mating with a distal end of the apex seal.

10. The assembly of claim 1, wherein the cover plates define central bores.

* * * * *